A. R. BAILEY.
Milk-Coolers.
No. 149,705.  
Patented April 14, 1874.
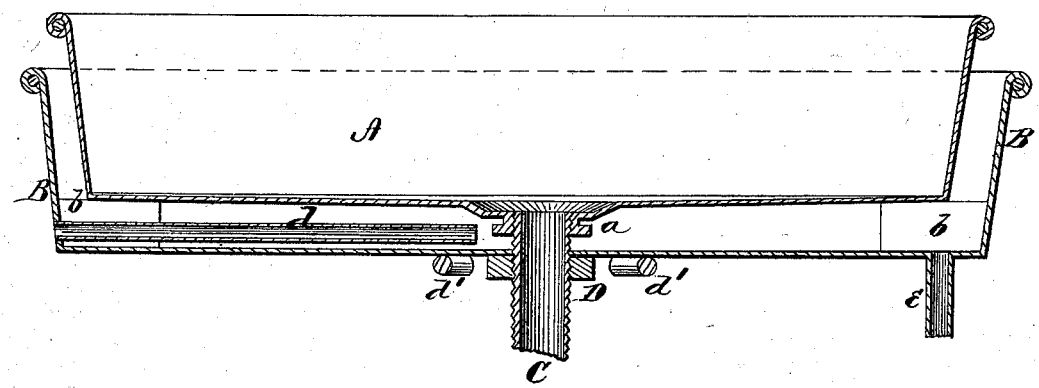
WITNESSES.  
INVENTOR.

UNITED STATES PATENT OFFICE.

AUGUSTUS R. BAILEY, OF ELMORE, VERMONT.

IMPROVEMENT IN MILK-COOLERS.

Specification forming part of Letters Patent No. 149,705, dated April 14, 1874; application filed February 13, 1874.

*To all whom it may concern:*

Be it known that I, AUGUSTUS R. BAILEY, of Elmore, in the county of Lamoille and in the State of Vermont, have invented certain new and useful Improvements in Milk-Pans and Coolers; and do hereby declare that the following is a full, clear, and exact description thereof, reference being had to the accompanying drawings, and to the letters of reference marked thereon, making a part of this specification.

The nature of my invention consists in the construction and arrangement of a milk-cooler and milk-pan, as will be hereinafter more fully set forth.

In order to enable others skilled in the art to which my invention appertains to make and use the same, I will now proceed to describe its construction and operation, referring to the annexed drawing, which represents a longitudinal vertical section of my milk-pan and cooler.

A represents an ordinary milk-pan of any suitable dimensions, provided with a central aperture in its bottom. To the under side of the bottom of the pan A, and corresponding with the central aperture in the same, is secured a short downward-projecting sleeve, $a$, provided with interior or female screw-threads. B represents the cooler, it being a pan of a little larger dimensions than the milk-pan A. In each corner, at the bottom of the cooler B, is a ledge or offset, $b$, upon which the pan A rests. In the center of the bottom of the cooler B is an aperture, through which is passed a hollow screw, C, and said screw is screwed into the thimble or sleeve $a$ on the bottom of the milk-pan A. Upon the hollow screw C is screwed a nut, D, up against the bottom of the cooler. Between the nut D and the bottom of the cooler suitable washers should be interposed to make a perfectly water-tight joint, and prevent the water in the cooler from leaking out at this. The bottom of the cooler B is strengthened by means of ribs $d'$ $d'$ across the center, and when the nut D is screwed up tightly, it will draw the bottom of the milk-pan downward in the center, making the entire bottom slightly concave, so that all the milk, after being cooled, will settle down toward the center, and all of it be drawn off without danger of any of the water from the cooler mingling with it.

Heretofore in milk-coolers of this class, the water has generally been admitted at one end of the cooler and out at the other, which has made the milk at one end of the milk-pan much cooler than at the other, as the water during its passage from one end to the other gradually increases in temperature from the effects of the heat in the milk.

To obviate this difficulty, I provide the cooler B with a pipe, $d$, extending from one end to near the center, so that the water will enter the cooler at or near the center, and spread evenly toward both ends, thus cooling the milk uniformly. $e$ is the outlet-pipe for the water from the cooler B.

Having thus fully described my invention, what I claim as new, and desire to secure by Letters Patent, is—

1. The combination of the milk-pan A, provided with downward-projecting screw-sleeve $a$, the cooler B, having corner-ledges $b$ $b$, the hollow screw C, and nut D, for drawing downward the central portion of the bottom of the pan A, all constructed substantially as and for the purposes herein set forth.

2. The combination of the pan A with sleeve $a$, and hollow screw C with the cooler B, provided with ledges $b$ $b$, pipe $d$, ribs $d'$ $d'$, and the nut D, all substantially as and for the purposes herein set forth.

In testimony that I claim the foregoing I have hereunto set my hand this 18th day of August, 1873.

A. R. BAILEY.

Witnesses:
NORMAN CAMP,
HARVEY STONE.